(12) United States Patent
Utoh

(10) Patent No.: US 8,578,197 B2
(45) Date of Patent: Nov. 5, 2013

(54) IMAGE PROCESSING APPARATUS, CONTROL METHOD FOR IMAGE PROCESSING APPARATUS, AND COMPUTER-READABLE STORAGE MEDIUM

(75) Inventor: Yohsuke Utoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 216 days.

(21) Appl. No.: 13/296,459

(22) Filed: Nov. 15, 2011

(65) Prior Publication Data

US 2012/0151230 A1    Jun. 14, 2012

(30) Foreign Application Priority Data

Dec. 8, 2010   (JP) .................................. 2010-274037

(51) Int. Cl.
    *G06F 1/00*      (2006.01)
    *G06K 15/00*     (2006.01)
(52) U.S. Cl.
    USPC ........................... 713/330; 713/300; 358/1.14
(58) Field of Classification Search
    USPC .................................. 713/300–340; 358/1.14
    See application file for complete search history.

(56) References Cited

U.S. PATENT DOCUMENTS

| | | | | |
|---|---|---|---|---|
| 5,239,495 A | * | 8/1993 | Nanno et al. | 713/321 |
| 5,339,446 A | * | 8/1994 | Yamasaki et al. | 713/340 |
| 5,410,713 A | * | 4/1995 | White et al. | 713/330 |
| 5,978,922 A | * | 11/1999 | Arai et al. | 713/323 |
| 6,977,739 B2 | | 12/2005 | Higuchi et al. | |
| 7,613,404 B2 | * | 11/2009 | Takeuchi et al. | 399/8 |
| 7,657,215 B2 | | 2/2010 | Yamazaki | |
| 7,979,726 B2 | * | 7/2011 | Nakamura et al. | 713/323 |
| 8,233,173 B2 | * | 7/2012 | Arai et al. | 358/1.15 |
| 8,321,702 B2 | * | 11/2012 | Kaneko et al. | 713/320 |
| 8,390,856 B2 | * | 3/2013 | Kawata et al. | 358/1.15 |
| 2003/0131206 A1 | * | 7/2003 | Atkinson et al. | 711/156 |

FOREIGN PATENT DOCUMENTS

| | | |
|---|---|---|
| JP | 3517527 | 4/2004 |
| JP | 2007-133269 | 5/2007 |

* cited by examiner

*Primary Examiner* — Paul R Myers
(74) *Attorney, Agent, or Firm* — IPUSA, PLLC

(57) ABSTRACT

An image processing apparatus includes a managing part to perform a first process to store the log information in a storage unit and a second process necessary to turn OFF a main power, a generating part to generate the log information by performing a third process necessary to turn OFF the main power, and to send to the managing part a first request signal causing the managing part to perform the first process on the generated log information, and a request part to send to the managing part a second request signal causing the managing part to perform the second process and to send to the generating part a third request signal causing the generating part to perform the third process, when a detecting part detects an OFF state of a main power switch.

18 Claims, 8 Drawing Sheets

IMAGE PROCESSING APPARATUS, CONTROL METHOD FOR IMAGE PROCESSING APPARATUS, AND COMPUTER-READABLE STORAGE MEDIUM

CROSS-REFERENCE TO RELATED APPLICATIONS

This application claims the benefit of a Japanese Patent Application No. 2010-274037 filed on Dec. 8, 2010, in the Japanese Patent Office, the disclosure of which is hereby incorporated by reference.

BACKGROUND OF THE INVENTION

1. Field of the Invention

The present invention relates to image processing apparatuses, control methods for image processing apparatuses, and computer-readable storage media.

2. Description of the Related Art

When turning OFF a main power of an image processing apparatus, a user needs to directly turn OFF a main power switch. However, when the main power switch is turned OFF during operation of the image processing apparatus, such as during a print operation, a software error or a hardware error may be generated thereby. Hence, an image forming apparatus which makes preparations to turn OFF the main power when the main power switch is turned OFF before actually turning OFF the main power has been proposed in a Japanese Laid-Open Patent Application No. 2007-133269, for example.

However, according to the proposed image forming apparatus, the main power is turned OFF after a predetermined time elapses from the time when the main power switch is actually turned OFF. For this reason, it may not be possible to retain all log information related to a post-processing for turning OFF the main power, such as cancelling a print job.

SUMMARY OF THE INVENTION

Accordingly, it is a general object in one embodiment of the present invention to provide a novel and useful image processing apparatus, control method therefor, and a computer-readable storage medium, in which the problem described above may be suppressed.

Another and more specific object in one embodiment of the present invention is to provide an image processing apparatus, a control method therefor, and a computer-readable storage medium that may store all log information when a main power switch is turned OFF, before turning OFF a main power.

According to one aspect of the present invention, an image processing apparatus may include a main power switch configured to turn OFF a main power; a detecting part configured to detect an OFF state of the main power switch; a storage unit configured to store log information; a managing part configured to perform a first process to store the log information in the storage unit and a second process necessary to turn OFF the main power; a generating part configured to generate the log information by performing a third process necessary to turn OFF the main power, and to send to the managing part a first request signal causing the managing part to perform the first process on the generated log information; and a request part configured to send to the managing part a second request signal causing the managing part to perform the second process and to send to the generating part a third request signal causing the generating part to perform the third process, when the detecting part detects the OFF state of the main power switch, wherein the generating part sends a third end signal to the request part when the third process and a process of sending the first request signal end, wherein the managing part sends a second end signal to the request part when the second process ends, wherein the request part sends a log storage request end signal to the managing part when the second end signal and the third end signal are received; and wherein the managing part stores all log information requested by the first request signal to be stored in the storage unit by a time when the log storage request end signal is received before turning OFF the main power.

According to another aspect of the present invention, a control method to control an image processing apparatus including a main power switch, a detecting part, a managing part, a generating part, and a request part, may include performing, by the managing part, a first process to store log information in a storage unit and a second process necessary to turn OFF a main power; generating, by the generating part, the log information by performing a third process necessary to turn OFF the main power, and sending a first request signal causing the managing part to perform the first process on the generated log information; and sending, by the request part, a second request signal causing the managing part to perform the second process and a third request signal causing the generating part to perform the third process, when an OFF state of the main power switch is detected by the detecting part, wherein the generating sends, by the generating part, a third end signal to the request part when the third process and a process of sending the first request signal end, wherein the performing sends, by the managing part, a second end signal to the request part when the second process ends, wherein the sending, by the request part, sends a log storage request end signal to the managing part when the second end signal and the third end signal are received; and wherein the performing, by the managing part, stores all log information requested by the first request signal to be stored in the storage unit by a time when the log storage request end signal is received before turning OFF the main power.

According to still another aspect of the present invention, a non-transitory computer-readable storage medium that stores a program which, when executed by a computer, causes the computer to perform a control process of an image processing apparatus that includes the computer and a main power switch, may cause the computer to perform a detecting procedure causing the computer to detect an OFF state of the main power switch; a managing procedure causing the computer to perform a first process to store log information in a storage unit and a second process necessary to turn OFF a main power; a generating procedure causing the computer to generate the log information by performing a third process necessary to turn OFF the main power, and to send a first request signal causing the managing procedure to perform the first process on the generated log information; and a requesting procedure causing the computer to send a second request signal causing the managing procedure to perform the second process and a third request signal causing the generating procedure to perform the third process, when an OFF state of the main power switch is detected by the detecting procedure, wherein the generating procedure causes the computer to send a third end signal to the requesting procedure when the third process and a process of sending the first request signal end, wherein the managing procedure causes the computer to send a second end signal to the requesting procedure when the second process ends, wherein the requesting procedure causes the computer to send a log storage request end signal to the managing procedure when the second end signal and the third end signal are received; and wherein the managing procedure causes the computer to store all log information requested by the first request signal to be stored in the storage unit by a time when the log storage request end signal is received before turning OFF the main power.

Other objects and further features of the present invention will be apparent from the following detailed description when read in conjunction with the accompanying drawings.

DESCRIPTION OF THE PREFERRED EMBODIMENTS

A description will be given of embodiments of an image processing apparatus, a control method therefor, and a computer-readable storage medium according to the present invention.

[First Embodiment]

Figure 1:
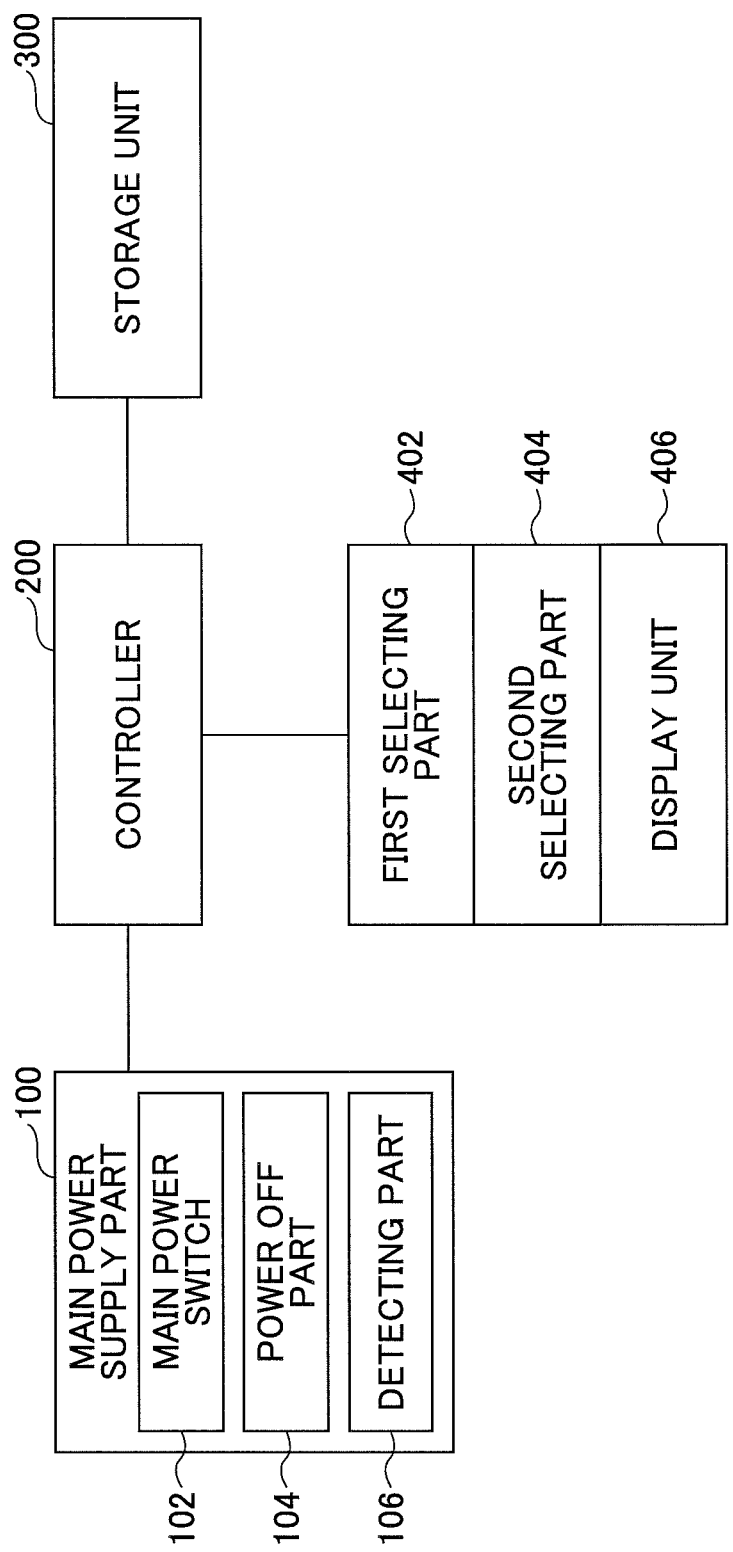
FIG. 1 is a block diagram illustrating an example of a functional structure of an image processing apparatus in a first embodiment of the present invention.

FIG. 1 is a block diagram illustrating an example of a functional structure of an image processing apparatus in a first embodiment of the present invention. The functional structure of the image processing apparatus in each of second through fourth embodiments of the present invention described later, may be the same as that illustrated in FIG. 1.

The image processing apparatus may be formed by any suitable apparatus configured to perform a process on an image, for example. Examples of the image processing apparatus may include an image forming apparatus configured to form an image, an image display apparatus configured to display an image on a display unit (or display means), and the like. For example, the image forming apparatus may be formed by a printer, a facsimile apparatus, a copying apparatus, a plotter, a MFP (Multi-Function Peripheral) or the like.

In the example illustrated in FIG. 1, the image processing apparatus includes a main power supply part 100, a controller 200, and a storage unit 300. The main power supply part 100 includes a main power switch 102, a power OFF part 104, and a detecting part 106. The main power switch 102 may be formed by a hardware of the image processing apparatus. When turning OFF the power of the image processing apparatus, a user turns OFF the main power switch 102 in order to turn OFF the main power of the image processing apparatus. The detecting part 106 detects an OFF state of the main power switch 102. When the main power is turned OFF, all devices or units within the image processing apparatus are turned OFF.

The power OFF part 104 may be formed by a relay switch that turns OFF the main power of the image processing apparatus when a process that will be described later ends after the main power switch 102 is turned OFF by the user. The controller 200 may include various modules. For example, the controller 200 may be formed by a processor, such as a CPU (Central Processing Unit). The processor may function as the various modules by executing suitable programs which may be stored in a suitable non-transitory computer-readable storage medium. In other words, the non-transitory computer-readable storage medium may store a program which, when executed by a processor (or computer), causes the processor (or computer) to perform a control process to control the operation (including power OFF control) of the image processing apparatus that includes the processor (or computer). The storage unit 300 may store log information. For example, the storage unit 300 may be formed by any suitable storage device or unit, including a semiconductor memory device, capable of storing the log information.

Figure 2:
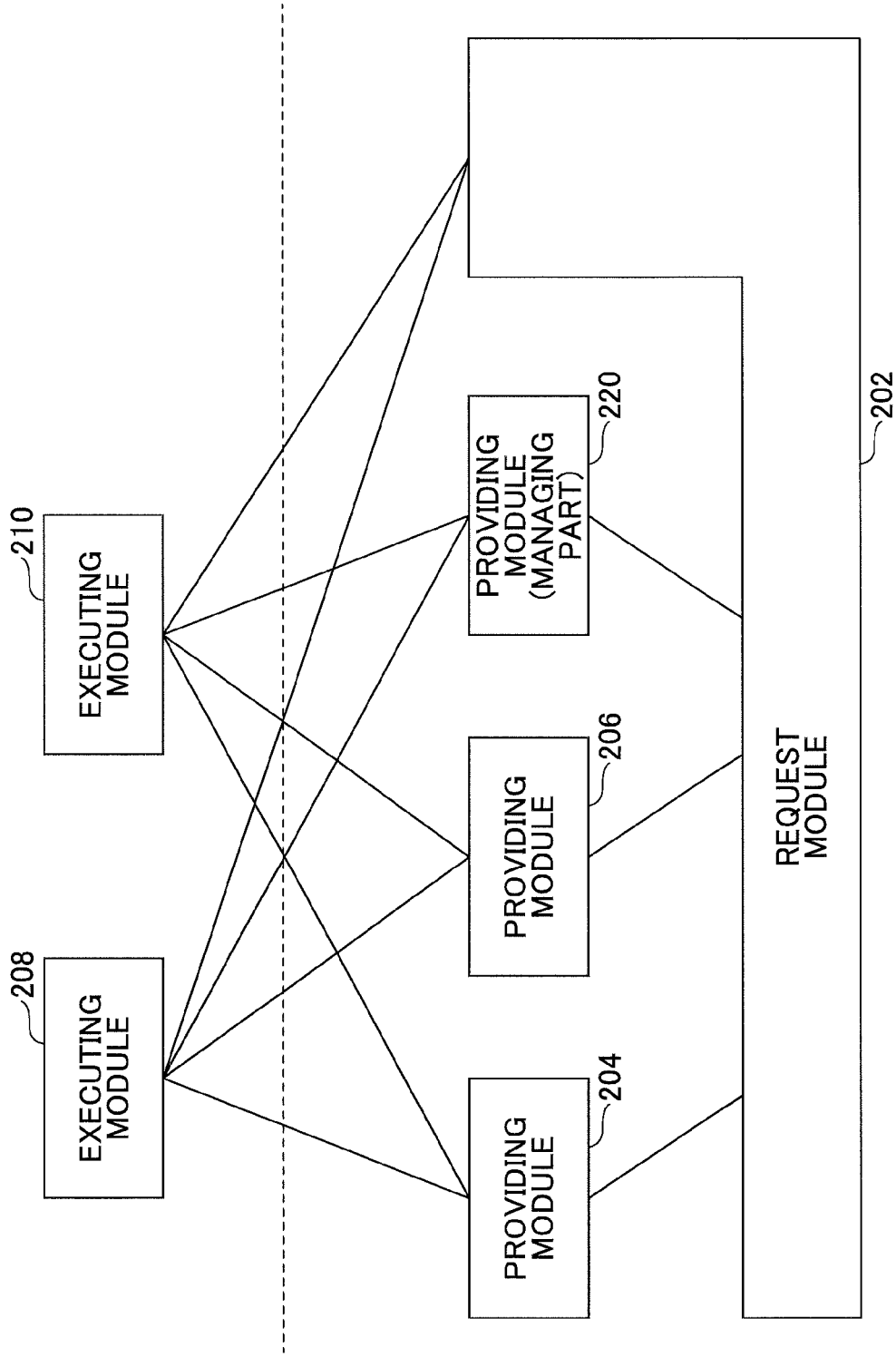
FIG. 2 is a block diagram illustrating an example of a connection correlation of modules in the first embodiment.
Figure 3:
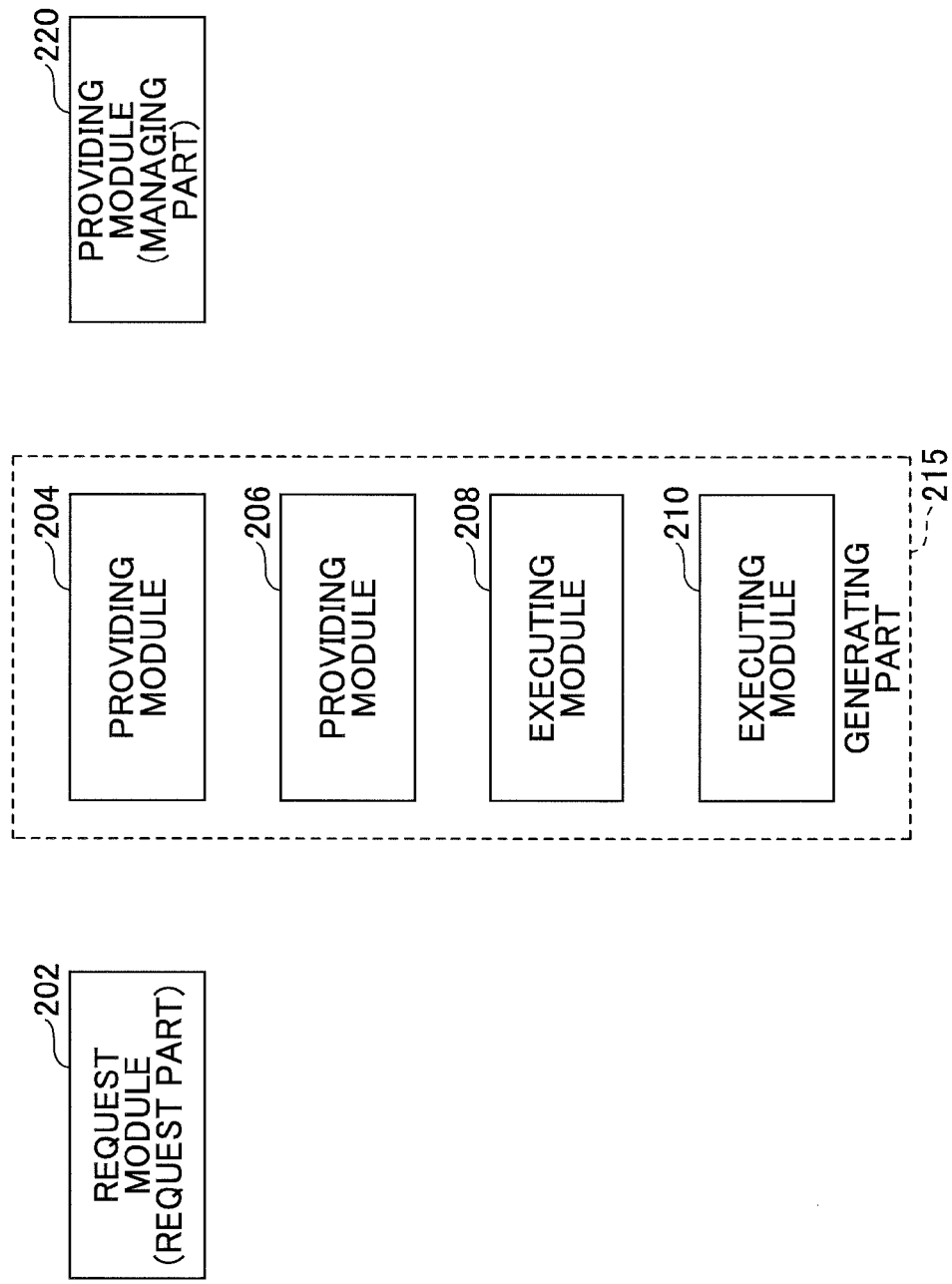
FIG. 3 is a block diagram illustrating an example of a controller in the first embodiment.

FIG. 2 is a block diagram illustrating an example of a connection correlation of modules in the first embodiment, and FIG. 3 is a block diagram illustrating an example of the controller in the first embodiment. The controller 200 illustrated in FIGS. 2 and 3 include a request module 202, a providing module 204, a providing module 206, an executing module 208, an executing module 210, and a providing module 220.

The providing modules 204 and 206 may form service modules that provide services to the executing modules 208 and 210. In a case in which the image processing apparatus is formed by the image forming apparatus, for example, the services may include a service to retain images, a service to edit images, and the like.

The executing modules 208 and 210 may be formed by application modules that execute the services provided by the providing modules 204 and 206. In the case in which the image processing apparatus is formed by the image forming apparatus, for example, the executing modules 208 and 210 may be formed by a copy application, a printer application, and the like.

The providing modules 204 and 206 generate log information indicating that a service has been provided. In addition, the executing modules 208 and 210 generate log information indicating that a service has been executed. The providing modules 204 and 206 and the executing modules 208 and 210 may form a generating part (or generating means) 215. The generating part 215 generates log information indicating that a process has been performed.

The providing module 220 stores the log information in the storage unit 300. In the following description, the providing module 220 may also be referred to as "a managing part (or managing means) 220", and the process of storing the log information in the storage unit 300 may also be referred to as "a first process". In addition, the managing part 220 performs a process necessary in order to turn OFF the main power, when the user turns OFF the main power switch 102. The process necessary in order to turn OFF the main power may also be referred to as "a second process". For example, the second process may include a process of transferring the log information generated by the generating part 215 to an external managing apparatus (not illustrated), and a process of reading the log information.

The request module 202 controls an order of the processes of each of the modules 204, 206, 208 and 210 and the managing part 220 when turning OFF the main power. The request module 202 may also be referred to as "a request part (or request means) 202".

Figure 4:
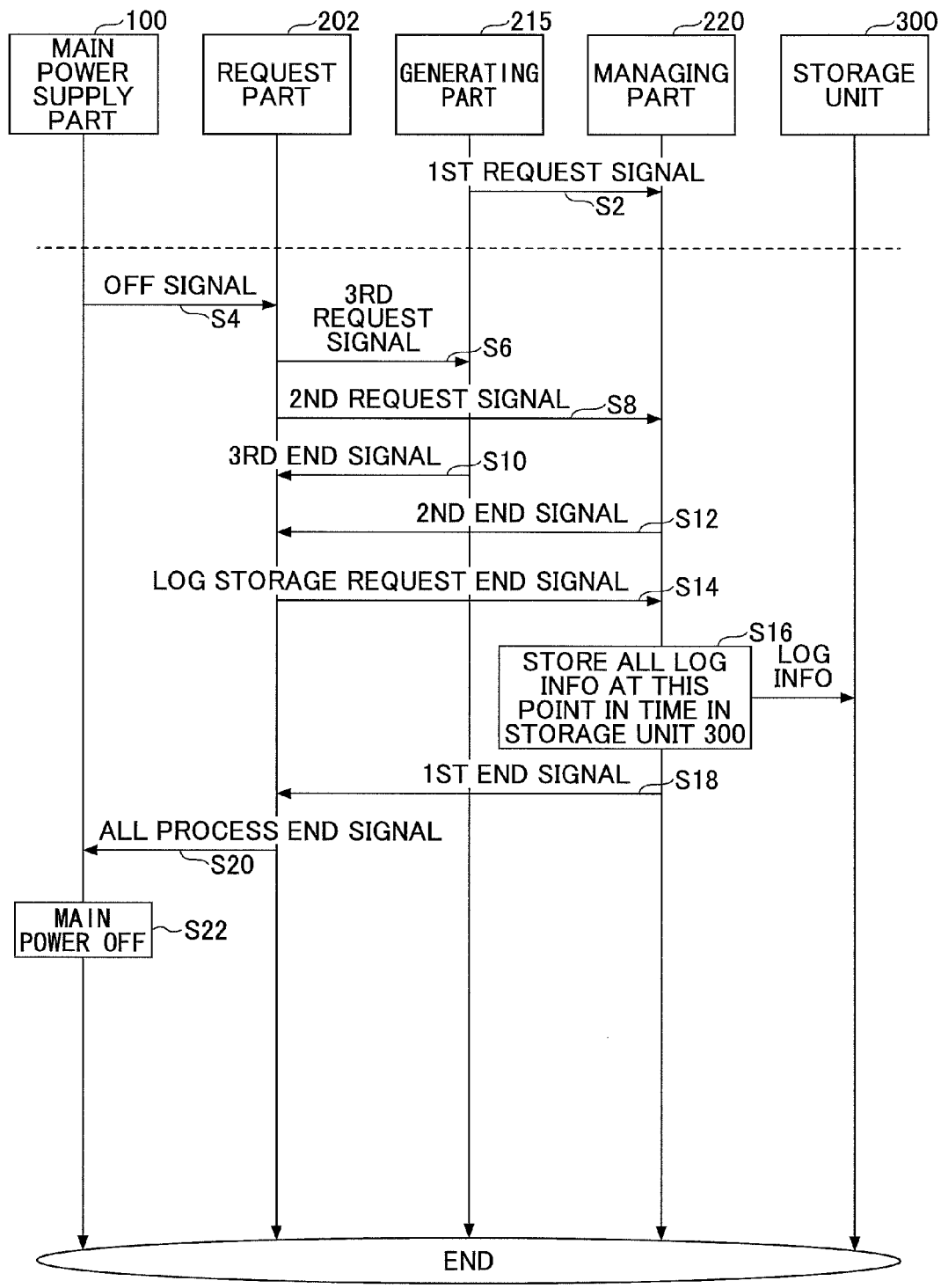
FIG. 4 is a diagram illustrating a first example of a process flow of the first embodiment.

FIG. 4 is a diagram illustrating a first example of a process flow of this embodiment. In FIG. 4, the providing modules 204 and 206 and the executing modules 208 and 210 of the generating part 215 send a first request signal with respect to the managing part 220 (step S2). The first request signal causes the managing part 220 to perform the first process. The first process causes the managing part 220 to store the log information generated by the generating part 215 in the storage unit 300. In other words, each of the providing modules 204 and 206 and the executing modules 208 and 210 sends the first request signal in order to store the log information generated therein in the storage unit 300. In addition, in order to store the log information generated in the generating part 215 in the storage unit 300, the generating part 215 sends the first request signal to the managing part 220 regardless of whether it is before or after the main power switch 102 is turned OFF (step S2). In FIG. 4, only one step S2 for sending the first request signal is illustrated in order to simplify the figure.

When the user turns OFF the main power switch 102, the detecting part 106 detects that the main power switch 102 is turned OFF and sends an OFF signal to the request part 202 (step S4). Hence, the request part 202 sends a third request signal with respect to the generating part 215 (step S6), and sends a second request signal with respect to the managing part 220 (step S8).

The third signal causes the generating part 215 to perform a third process. The third process may include, for example, a process to stop all processes performed by the generating part 215, a process to send the first request signal to the managing part 220, and the like. All processes performed by the generating part 215 may include processes of the providing modules 204 and 206 to provide the services to the executing modules 208 and 210, and processes of the executing modules 208 and 210 to execute the services.

The second request signal causes the managing part 220 to perform the second process. FIG. 4 illustrates an example in which the second request signal is sent after sending the third request signal, however, the order of sending the third request signal and the second request signal may be reversed. Further, the third request signal and the second request signal may be sent simultaneously.

The generating part 215 sends a third end signal to the request part 202 when the third process ends (step S10). The third process ends when the process to stop all processes performed by the generating part 215 (the processes of the providing modules 204 and 206 to provide the services to the executing modules 208 and 210, and the processes of the executing modules 208 and 210 to execute the services), the process to send the first request signal to the managing part 220, and the like end. In other words, after sending the third end signal to the request part 202, the generating part 215 does not generate the log information and does not send the first request signal with respect to the managing part 220. Hence, during a time A from the time when the main power switch 102 of the image processing apparatus is turned ON to a time when the generating part 215 sends the third end signal to the request part 202, the generating part 215 generates the log information and sends the first request signal to the managing part 220. The managing part 220 thus stores the log information in the storage unit 300 during the time A.

When the second process ends, the managing part 220 sends a second end signal to the request part 202 (step S12). The request part 202 recognizes that the second process and the third process have ended when the second end signal is received. When the request part 202 receives the second end signal and the third end signal, the request part 202 sends a log storage request end signal to the managing part 220 (step S14). The log storage request end signal causes the managing part 220 to end the process of storing the log information in the storage unit 300.

When the managing part 220 receives the log storage request end signal, the managing part 220 stores in the storage unit 300 all log information that is requested to be stored by the first request signal by the time when the log storage request end signal is received (step S16).

When the managing part 220 stores all of the log information in the storage unit 300, the managing part 220 sends to the request part 202 a first end signal indicating that the first process to store all of the log information in the storage unit 300 has ended (step S18). When the request part 202 receives the first end signal, the request part 202 recognizes that the first process (that is, the process to store all of the log information in the storage unit 300), the second process, and the third process have all ended.

Thereafter, the request part 202 sends to the power supply part 100 an all process end signal indicating that all of the first, second and third processes have ended (step S20). When the power supply part 100 receives the all process end signal, the power OFF part 104 turns OFF the main power of the image processing apparatus (step S22).

According to this first example of the process flow of this embodiment, when the user turns OFF the main power switch 102 of the image processing apparatus, the main power is turned OFF after the third process (the process of generating log information of each module of the generating part 215, and the process of requesting the managing part 220 to store the log information) of the generating part 215 and the second process end. The log information is not generated after the second process and the third process end. Hence, the main power may be turned OFF after storing all of the log information.

In addition, when the process to store all of the log information in the storage unit 300 by the managing part 220 ends in the step S16, the managing part 220 may generate and store in the storage unit 300 end log information indicating that all of the log information is stored in the storage unit 300. After the end log information is stored in the storage unit 300, the generating part 215 does not generate the log information and does not store the log information, that is, the image processing apparatus is inactive (or does not operate). Accordingly, when the end log information is stored in the storage unit 300, the user may verify that the image processing apparatus is inactive after the end log information is stored in the storage unit 300.

It may be preferable to allow the user to select whether or not to store the end log information in the storage unit 300. More particularly, the user may select to store the end log information in the storage unit 300 by making the selection from a first selecting part 402. For example, the first selecting part 402 may be formed by a LCD (Liquid Crystal Display) provided with key switches (hard keys) and a touch-screen panel function (GUI (Graphical User Interface) including software keys). A second selecting part 404, which will be described later, may have a structure similar to that of the first selecting part 402. Hence, the first selecting part 402 and the second selecting part 404 may function as a UI (User Interface) to be manipulated by the user when utilizing the functions of the image processing apparatus.

By making it possible for the user to select from the first selecting part 402 whether or not to store the end log information in the storage unit 300, the may select not to store the end log information in the storage unit 300 in order to reduce the costs of generating the end log information and storing the end log information.

[Second Embodiment]

Next, a description will be given of the image processing apparatus in the second embodiment of the present invention. In the step S16 of the first embodiment illustrated in FIG. 4, it may take a considerably long time to store all of the log information in the storage unit 300, due to reasons such as a large amount of log information to be stored. The user may feel uncomfortable or be stressed when the storage of all of the log information in the storage unit 300 takes a long time. Hence, in the image processing apparatus of this second embodiment, the user is informed in advance when all of the log information may not be stored within a predetermined time T, in order to reduce the stress or the like on the user.

Figure 5:
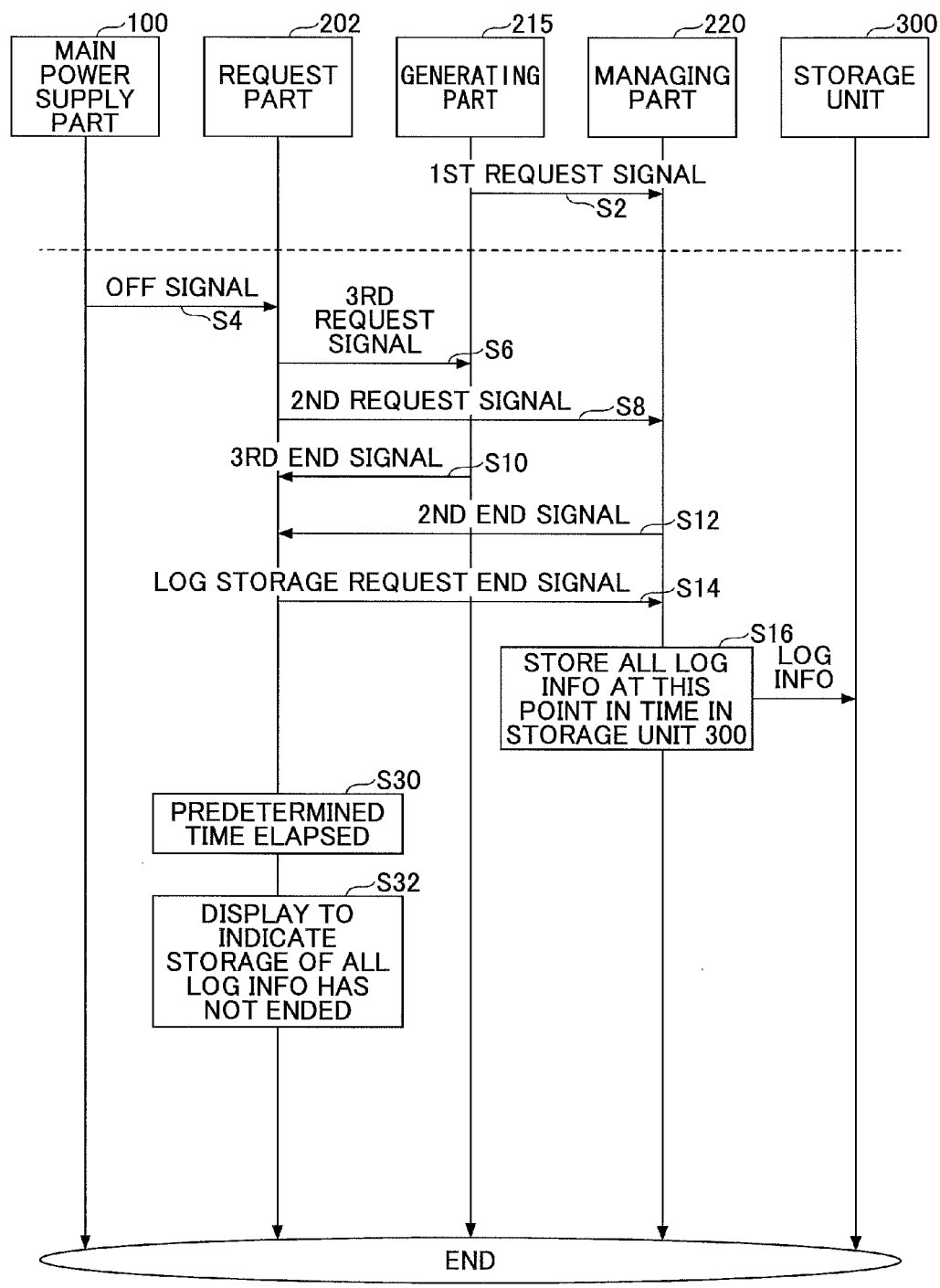
FIG. 5 is a diagram illustrating an example of the process flow of a second embodiment of the present invention.

FIG. 5 is a diagram illustrating an example of the process flow of the second embodiment of the present invention. In FIG. 5, those steps that are the same as those corresponding steps in FIG. 4 are designated by the same reference numerals, and a description thereof will be omitted. In FIG. 5, steps S30 and S32 are performed after the step S16.

The request part 202 includes a timer (or timer means, not illustrated). The request part 202 uses this timer in order to measure the time from the time when the log storage request end signal is sent (step S30). In addition, the predetermined time T is set in advance and stored in the storage unit 300 or in another storage unit (not illustrated). When the time measured by the timer exceeds the predetermined time T, the request part 202 displays on a display unit 406 information indicating that all of the log information could not be stored within the predetermined time T, such as a message "All of the log information could not be stored within the predetermined time T" (step S32).

The method of informing the user that all of the log information could not be stored in the storage unit 300 within the predetermined time T is not limited to the method of displaying the information or message on a screen of the display unit 406. For example, in the case in which the image processing apparatus is formed by the image forming apparatus, the information or message may be printed on a recording medium such as paper. In addition, the information or message may be output by sound or speech. Of course, any suitable combination of such methods may be employed in order to inform the user that all of the log information could not be stored within the predetermined time T.

According to the image processing apparatus in this embodiment, the user may be informed when all of the log information cannot be stored in the storage unit 300 within the predetermined time T. Hence, the user may avoid feeling uncomfortable or stressed, because the user is informed when all of the log information cannot be stored in the storage unit 300 within the predetermined time T, even when a considerably long time is required to store all of the log information.

[Third Embodiment]

Next, a description will be given of the image processing apparatus in the third embodiment of the present invention. In the second embodiment, the user is informed when all of the log information cannot be stored in the storage unit 300 within the predetermined time T, by displaying the information or message on the display unit 406, for example. On the other hand, in the image processing apparatus of this third embodiment, when all of the log information may not be stored in the storage unit 300 within the predetermined time T, the user is urged to select whether the main power is to be turned OFF or the process of storing the log information is to be continued, in order to improve the convenience to the user or improve the ease with which the image processing apparatus may be utilized by the user.

Figure 6:
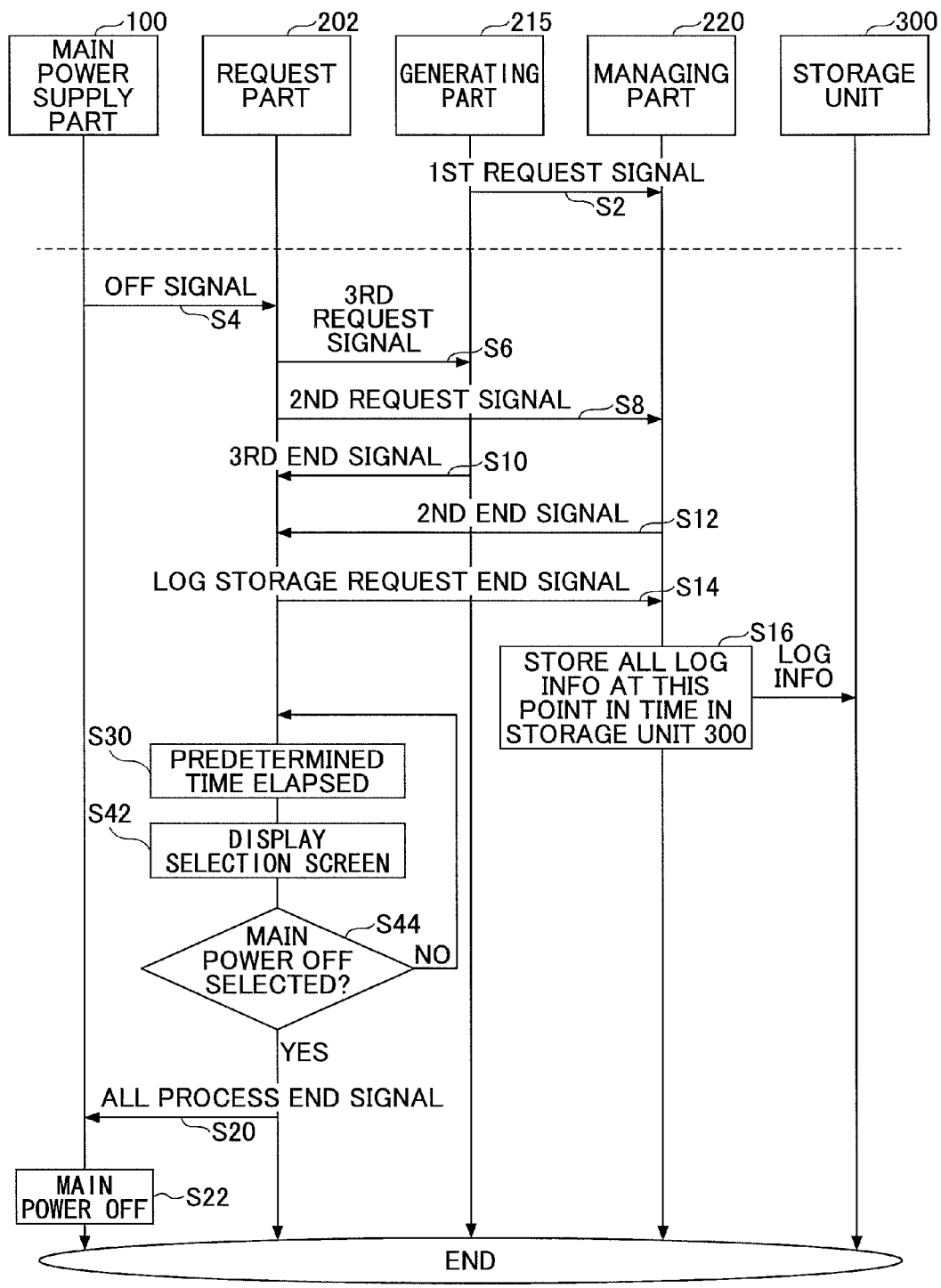
FIG. 6 is a diagram illustrating an example of the process flow of a third embodiment of the present invention.

FIG. 6 is a diagram illustrating an example of the process flow of the third embodiment of the present invention. In FIG. 6, those steps that are the same as those corresponding steps in FIGS. 4 and 5 are designated by the same reference numerals, and a description thereof will be omitted. When compared to the process flow of FIG. 4, the process flow of FIG. 6 additionally includes steps S30, S42, and S44 between the steps S16 and S20.

Figure 7:
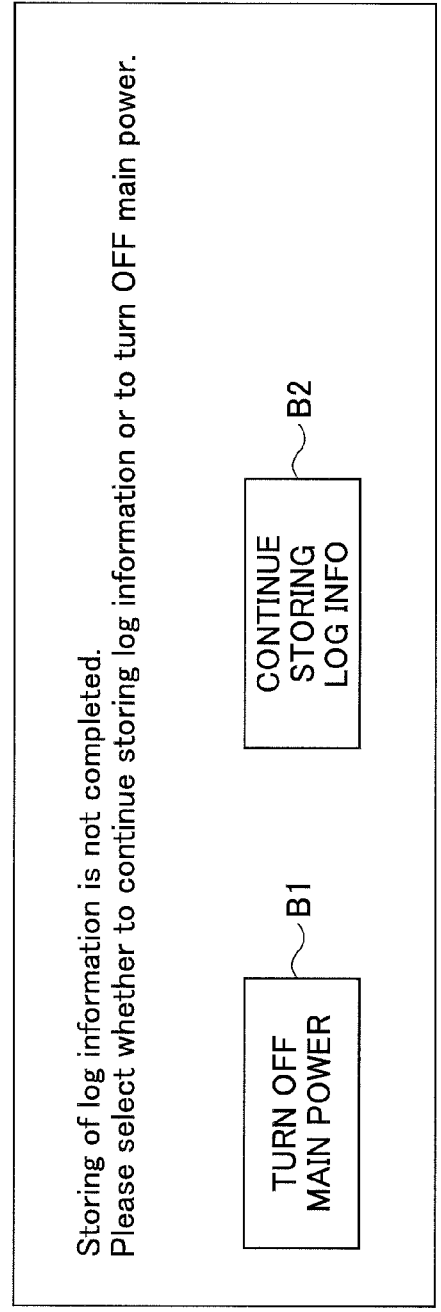
FIG. 7 is a diagram illustrating an example of a display screen in the third embodiment.

When the predetermined time T elapses in the step S30, the request part 202 displays a selection screen on the display unit 406 (step S42), in order to urge the user to select whether "to turn OFF the main power" or "to continue storing the log information". FIG. 7 is a diagram illustrating an example of the display screen in the third embodiment. FIG. 7 illustrates an example in which a "turn OFF main power" button B1 and a "continue storing log information" button B2 are electronically displayed on the display screen, that is, the touch-screen panel. The user may select the desired button by touching the button on the touch-screen panel. In this example, the second selecting part 404 is formed by the touch-screen panel.

The request part 202 judges whether the user's selection from the second selecting part 404 is to turn OFF the main power (step S44). If the user's selection is to continue storing the log information and the judgement result in the step S44 is No, the managing part 220 again continues the process of storing the log information in the storage unit 300 (step S16). In this case, when all of the log information is stored in the storage unit 300 before the predetermined time T elapses, the first end signal may be sent to the request part 202 in a step similar to step S18 illustrated in FIG. 4. On the other hand, when the predetermined time T again elapses before all of the log information is stored in the storage unit 300, the request part 202 again displays the selection screen on the display unit 406 (step S42).

On the other hand, if the user's selection from the second selecting part 404 is to turn OFF the main power and the judgement result in the step S44 is Yes, the request part 202 sends the all process end signal to the power supply part 100 (step S20). When the power supply part 100 receives the all process end signal, the power OFF part 104 turns OFF the main power of the image processing apparatus (step S22).

A step similar to the step S32 illustrated in FIG. 5, which displays on the display unit 406 the information indicating that all of the log information could not be stored in the storage unit 300 within the predetermined time T, may be performed before the step S42.

According to the image processing apparatus in this embodiment, the user may select whether to turn OFF the main power or to continue storing the log information in the storage unit 300, when all of the log information may not be stored in the storage unit 300 within the predetermined time T. Hence, it may be possible to improve the convenience to the user or improve the ease with which the image processing apparatus may be utilized by the user.

[Fourth Embodiment]

Figure 8:
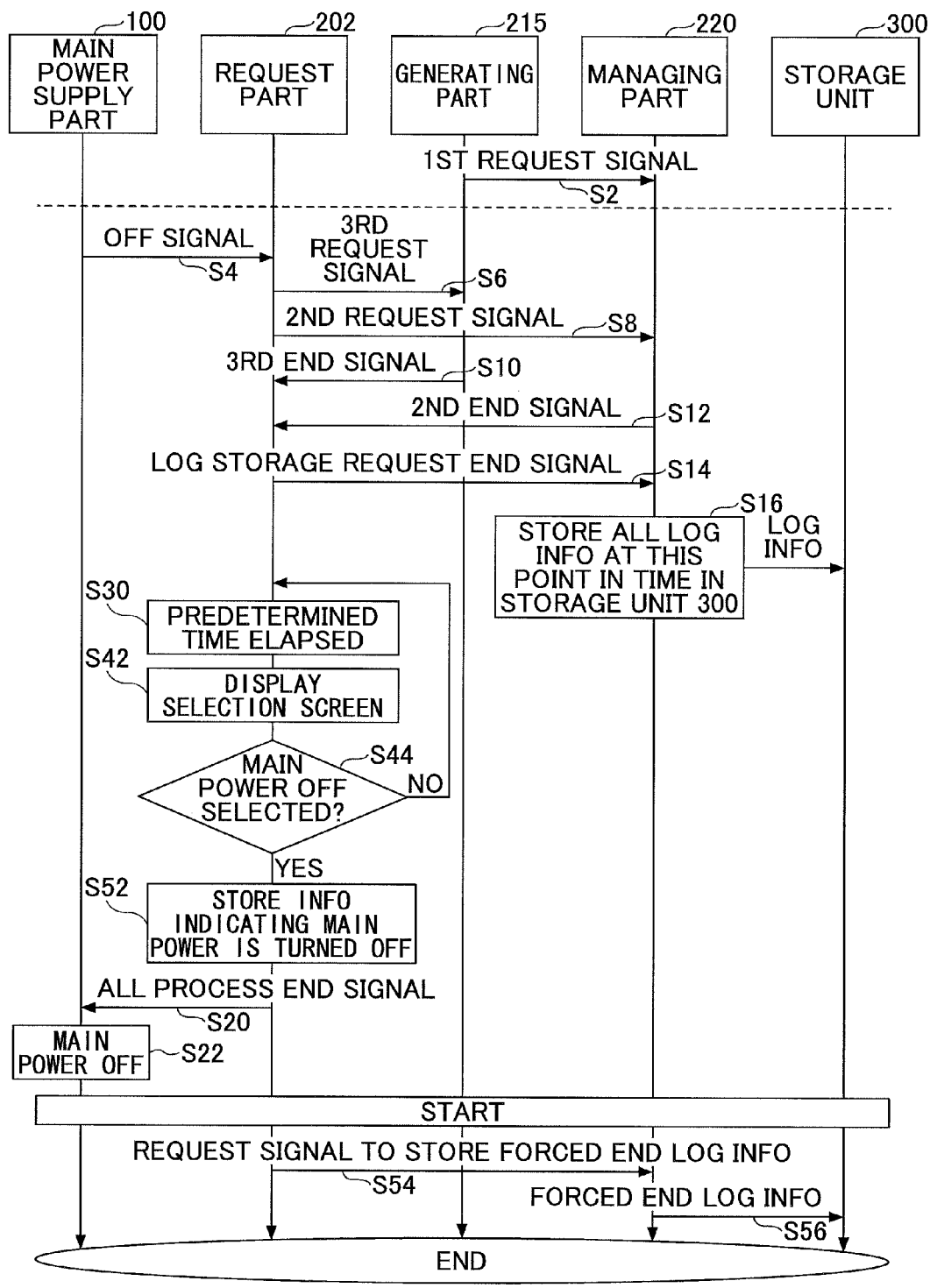
FIG. 8 is a diagram illustrating an example of the process flow of a fourth embodiment of the present invention.

Next, a description will be given of the image processing apparatus in the fourth embodiment of the present invention. FIG. 8 is a diagram illustrating an example of the process flow of the fourth embodiment of the present invention. In FIG. 8, those steps that are the same as those corresponding steps in FIG. 6 are designated by the same reference numerals, and a description thereof will be omitted. When compared to the process flow of FIG. 4, the process flow of FIG. 8 additionally includes steps S30, S42, S44, S52, S54, and S56.

When the predetermined time T elapses in the step S30, the request part 202 displays the selection screen on the display unit 406 (step S42). When the user's selection is to turn OFF the main power (Yes in step S44), the request part 202 stores log information indicating that the main power is forcibly turned OFF (step S52), and the process advances to the step S20 of the request part 202 and the step S22 of the main power supply part 100.

When the user restarts the image processing apparatus, the request part 202 sends a request signal to the managing part 220 requesting the managing part 220 to store the log information, (hereinafter also referred to as "forced end log information") indicating that the main power supply was forcibly turned OFF and stored in the step S52, in the storage unit 300 (step S54). In addition, when the managing part 220 receives the request signal from the request part 202, the managing part 220 stores the forced end log information in the storage unit 300 (step S56).

According to the image processing apparatus in this embodiment, when the process to store the log information in the storage unit 300 does not end within the predetermined time T and the main power is turned OFF, the log information (forced end log information) indicating that the main power was forcibly turned OFF may be stored in the storage unit 300 the next time the image processing apparatus is started. Hence, when the main power is forcibly turned OFF by the user and all of the log information could not be stored in the storage unit 300, a manager of the image processing apparatus may recognize the forced end log information when the log information is checked, in order to easily recognize that the main power was forcibly turned OFF by the user and all of the log information could not stored in the storage unit 300.

Although the embodiments are numbered "first", "second", "third" and "fourth" in the specification, the ordinal numbers do not imply priorities of the embodiments.

Further, the present invention is not limited to these embodiments, but various variations and modifications may be made without departing from the scope of the present invention.

What is claimed is:

1. An image processing apparatus comprising:
a main power switch configured to turn OFF a main power;
a detecting part configured to detect an OFF state of the main power switch;
a storage unit configured to store log information;
a managing part configured to perform a first process to store the log information in the storage unit and a second process necessary to turn OFF the main power;
a generating part configured to generate the log information by performing a third process necessary to turn OFF the main power, and to send to the managing part a first request signal causing the managing part to perform the first process on the generated log information; and
a request part configured to send to the managing part a second request signal causing the managing part to perform the second process and to send to the generating part a third request signal causing the generating part to perform the third process, when the detecting part detects the OFF state of the main power switch,
wherein the generating part sends a third end signal to the request part when the third process and a process of sending the first request signal end,
wherein the managing part sends a second end signal to the request part when the second process ends,
wherein the request part sends a log storage request end signal to the managing part when the second end signal and the third end signal are received; and
wherein the managing part stores all log information requested by the first request signal to be stored in the storage unit by a time when the log storage request end signal is received before turning OFF the main power.

2. The image processing apparatus as claimed in claim 1, wherein the managing part stores in the storage unit end log information indicating an end of a process to store the log information when the process to store the log information in the storage unit ends.

3. The image processing apparatus as claimed in claim 1, wherein the managing part includes a selecting part configured to select whether to store end log information indicating an end of a process to store the log information when the process to store the log information in the storage unit ends.

4. The image processing apparatus as claimed in claim 1, further comprising:
a display unit configured to display information indicating that a process of the managing part to store the log information has not ended, when the process to store the log information in the storage unit does not end within a predetermined time.

5. The image processing apparatus as claimed in claim 1, further comprising:
a selecting part configured to select whether to turn OFF the main power or to continue a process of storing the log information, when the process of the managing part to store the log information in the storage unit does not end within a predetermined time.

6. The image processing apparatus as claimed in claim 1, wherein the managing part stores log information, indicating that the main power was turned OFF when a process of the managing part to store the log information in the storage unit did not end within a predetermined time, in the storage unit a next time when the image processing apparatus is started.

7. A control method to control an image processing apparatus comprising a main power switch, a detecting part, a managing part, a generating part, and a request part, said control method comprising:
performing, by the managing part, a first process to store log information in a storage unit and a second process necessary to turn OFF a main power;
generating, by the generating part, the log information by performing a third process necessary to turn OFF the main power, and sending a first request signal causing the managing part to perform the first process on the generated log information; and
sending, by the request part, a second request signal causing the managing part to perform the second process and a third request signal causing the generating part to perform the third process, when an OFF state of the main power switch is detected by the detecting part,
wherein the generating sends, by the generating part, a third end signal to the request part when the third process and a process of sending the first request signal end,
wherein the performing sends, by the managing part, a second end signal to the request part when the second process ends,
wherein the sending, by the request part, sends a log storage request end signal to the managing part when the second end signal and the third end signal are received; and
wherein the performing, by the managing part, stores all log information requested by the first request signal to be stored in the storage unit by a time when the log storage request end signal is received before turning OFF the main power.

8. The control method as claimed in claim 7, wherein the performing, by the managing part, stores in the storage unit end log information indicating an end of a process to store the log information when the process to store the log information in the storage unit ends.

9. The control method as claimed in claim 7, wherein the performing, by the managing part, includes selecting whether to store end log information indicating an end of a process to store the log information when the process to store the log information in the storage unit ends.

10. The control method as claimed in claim 7, further comprising:
displaying, by a display unit of the image processing apparatus, display information indicating that a process of the managing part to store the log information has not ended, when the process to store the log information in the storage unit does not end within a predetermined time.

11. The control method as claimed in claim 7, wherein the performing, by the managing part, includes selecting whether to turn OFF the main power or to continue a process of storing the log information, when the process of the managing part to store the log information in the storage unit does not end within a predetermined time.

12. The control method as claimed in claim 7, wherein the performing, by the managing part, stores log information, indicating that the main power was turned OFF when a process of the managing part to store the log information in the storage unit did not end within a predetermined time, in the storage unit a next time when the image processing apparatus is started.

13. A non-transitory computer readable storage medium that stores a program which, when executed by a computer, causes the computer to perform a control process of an image processing apparatus that includes the computer and a main power switch, said control process comprising:
a detecting procedure causing the computer to detect an OFF state of the main power switch;
a managing procedure causing the computer to perform a first process to store log information in a storage unit and a second process necessary to turn OFF a main power;
a generating procedure causing the computer to generate the log information by performing a third process necessary to turn OFF the main power, and to send a first request signal causing the managing procedure to perform the first process on the generated log information; and
a requesting procedure causing the computer to send a second request signal causing the managing procedure to perform the second process and a third request signal causing the generating procedure to perform the third process, when an OFF state of the main power switch is detected by the detecting procedure,
wherein the generating procedure causes the computer to send a third end signal to the requesting procedure when the third process and a process of sending the first request signal end,
wherein the managing procedure causes the computer to send a second end signal to the requesting procedure when the second process ends,
wherein the requesting procedure causes the computer to send a log storage request end signal to the managing procedure when the second end signal and the third end signal are received; and
wherein the managing procedure causes the computer to store all log information requested by the first request signal to be stored in the storage unit by a time when the log storage request end signal is received before turning OFF the main power.

14. The non-transitory computer-readable storage medium as claimed in claim 13, wherein the managing procedure causes the computer to store in the storage unit end log information indicating an end of a process to store the log information when the process to store the log information in the storage unit ends.

15. The non-transitory computer-readable storage medium as claimed in claim 13, wherein the managing procedure causes the computer to accept a selection on whether to store end log information indicating an end of a process to store the log information when the process to store the log information in the storage unit ends.

16. The non-transitory computer-readable storage medium as claimed in claim 13, further comprising:
a displaying procedure causing the computer to display, by a display unit of the image processing apparatus, display information indicating that a process of the managing procedure to store the log information has not ended, when the process to store the log information in the storage unit does not end within a predetermined time.

17. The non-transitory computer-readable storage medium as claimed in claim 13, wherein the managing procedure causes the compute to accept a selection on whether to turn OFF the main power or to continue a process of storing the log information, when the process of the managing procedure to store the log information in the storage unit does not end within a predetermined time.

18. The non-transitory computer-readable storage medium as claimed in claim 13, wherein the managing procedure causes the computer to store log information, indicating that the main power was turned OFF when a process of the managing procedure to store the log information in the storage unit did not end within a predetermined time, in the storage unit a next time when the image processing apparatus is started.

* * * * *